C. H. PIXLEY.
OPHTHALMOMETER.
APPLICATION FILED MAY 22, 1911.

1,046,105.

Patented Dec. 3, 1912.
3 SHEETS—SHEET 1.

Witnesses

Inventor
Charles H. Pixley
by Benjamin & Rockhome
Attys

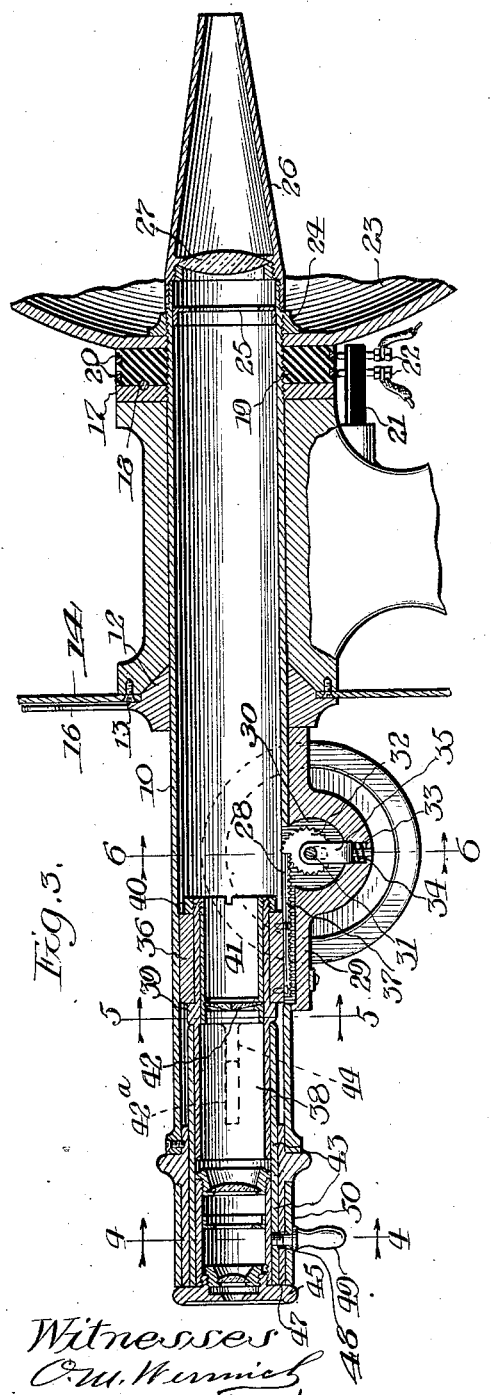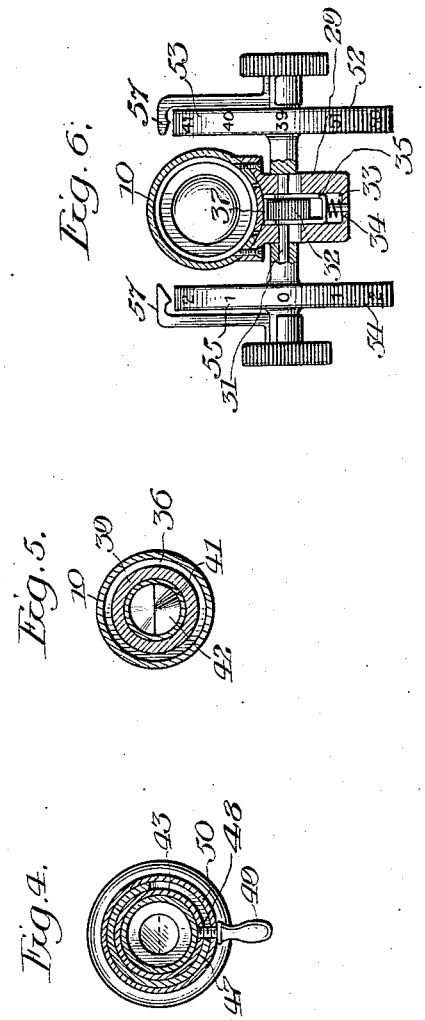

C. H. PIXLEY.
OPHTHALMOMETER.
APPLICATION FILED MAY 22, 1911.

1,046,105.

Patented Dec. 3, 1912.

3 SHEETS—SHEET 3.

WITH THE RULE       AGAINST THE RULE

Witnesses
O. M. Wernich
M. A. Milord

Inventor
Charles H. Pixley.
by Benjamin & Roark
attys

UNITED STATES PATENT OFFICE.

CHARLES H. PIXLEY, OF CHICAGO, ILLINOIS, ASSIGNOR TO F. A. HARDY & COMPANY, A CORPORATION OF ILLINOIS.

OPHTHALMOMETER.

1,046,105.  Specification of Letters Patent.  Patented Dec. 3, 1912.

Application filed May 22, 1911. Serial No. 628,708.

*To all whom it may concern:*

Be it known that I, CHARLES HENRY PIXLEY, a citizen of the United States, and a resident of Chicago, in the county of Cook and State of Illinois, have invented a new and useful Ophthalmometer, of which the following is a specification.

My present invention relates to improvements in ophthalmometers or instruments for measuring the curvature of the cornea of the eye, and has for its objects, first, the provision of facilities for measuring the curvature upon different meridians without the necessity of readjusting the mires or targets, one set of which has already been adjusted in either the meridians of greatest or least curvature; second, the provision of simple means for indicating the difference in measurement upon two successively examined meridians in terms of the refracting power of the meridians; and, third, the improvement of various structural features in the instrument which are fully described in the specification, and specifically pointed out in the appended claims. I attain these various objects by the mechanism illustrated in the accompanying drawings, in which—

Figure 1:
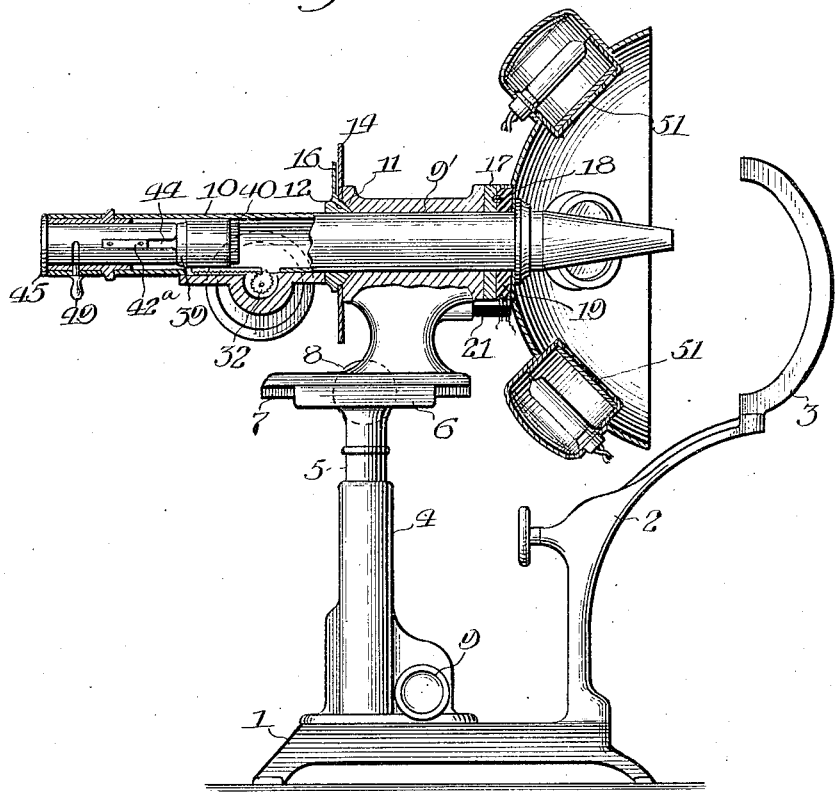
Figure 2:
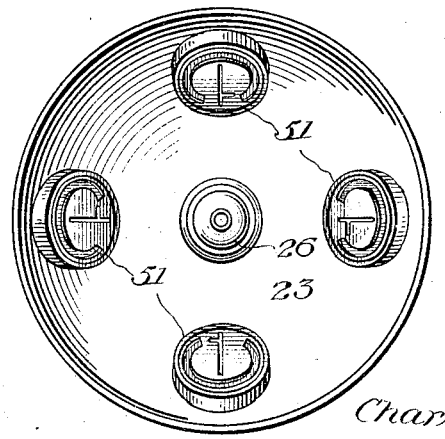
Figure 7:
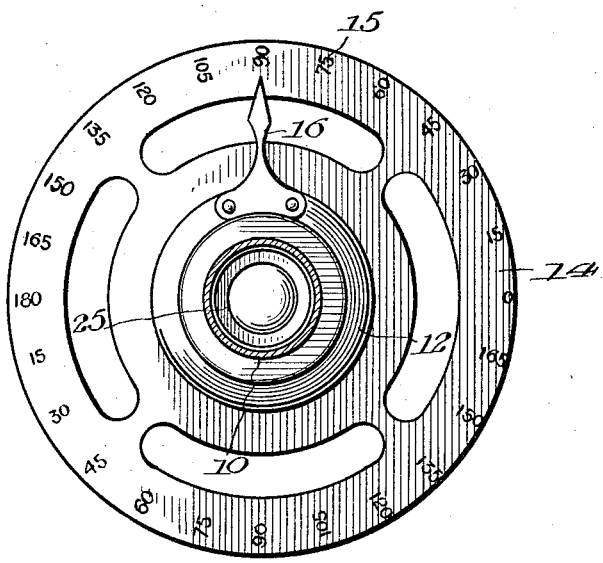
Figure 8:
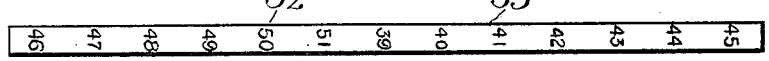
Figure 9:
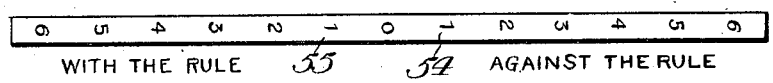
Figure 10:
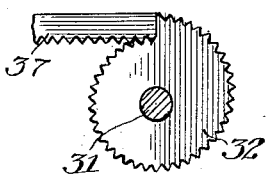

Figure 1 is a longitudinal elevation, partially in section; Fig. 2 is a view looking into the telescope and concave disk carrying the mires; Fig. 3 is a central longitudinal view through the telescope; Fig. 4 is a section on line 4—4 of Fig. 3; Fig. 5 is a section on line 5—5 of Fig. 3; Fig. 6 is a view of the wheels carrying the scales in which the tubes and their relation is shown in section on line 6—6 of Fig. 3; Fig. 7 is an elevation of the disk on which the scale is positioned which shows the meridians on which the observations are being made; Fig. 8 is an edge or peripheral view of the scale wheel which is fixed to the adjusting arbor; Fig. 9 is an edge or peripheral view of the scale wheel for showing the difference between successive observations; and Fig. 10 is a side view of the means whereby I can employ uniform scales upon the scale wheels.

Similar reference numerals refer to similar parts throughout the several views.

The instrument is mounted upon a stand for securing its proper positioning with relation to the eye of the patient, which comprises a suitable base, 1, having a bracket, 2, upon its forward end, which carries an adjustable rack, 3, for steadying the head. Also, arising from the rear of the base is a hollow bracket, 4, in which is slidably mounted a pillar, 5, the top of which terminates in a bracket 6 in which travels a carriage 7 having means 8 for racking it backward and forward. The stand also has means 9 for adjusting the vertical position of the bracket 6. This portion of the apparatus does not comprise any portion of my invention, and, therefore, does not require a more specific description.

The carriage, 7, has formed therein a horizontal bore, 9', which forms a bearing for a telescope tube, 10, so as to permit of the rotation thereof. In order to secure the smooth movement of the tube 10 in the bore, 9', the rear end of the bore, 9', is slanted outwardly at 11, and into the slanted portion fits a conical shaped collar, 12, secured to the telescope tube, 10.

To the rear vertical face of that part of the carriage, 7, in which the bore 9' is located, is secured by screws, 13, a disk, 14, which surrounds the telescope tube, and which has provided upon its rear face a scale, 15, of degrees running from right to left above and from left to right below the horizontal. Secured to the periphery of the collar, 12, is a pointer arm, 16, which extends in front of the disk, 13, and scale, 15, and serves to indicate the axis or meridian in which the observation is being made.

The portion of the telescope tube, 10, which extends through the bore, 9', and in front of the carriage, 7, is exteriorly threaded, and upon this is screwed a transversely split ring, 17, so as to hold the tube snugly in its bearing. A bolt, 18, serves to draw the split ring 17, tightly about the telescope tube and hold it in position. To the forward face of the split ring, 17, is secured a collar of electrically insulating material, 19, in the periphery of which are set rings, 20, of material for carrying the circuit to the lamps for illuminating the mires, to be hereafter described. A bracket, 21, of insulating material extends from the carriage, 7, opposite to the rings, 20, and binding and contact posts, 22, are carried thereby which contact with said rings. The binding posts are connected with any suitable source of electrical energy.

Screwed on to the telescope tube, 10, in front of the insulating collar, 19, is the forwardly concaved disk, 23, which is held in position by the lock nut, 24.

A diaphragm, 25, is mounted within the forward end of the tube 10, and on to the forward end of said tube is screwed a conical nose piece, 26, in which is mounted the objective lens or lens system, 27.

In the telescope tube, 10, behind the collar, 12, is provided a longitudinal slot, 28, and secured to the face of the tube to cover this slot is a block, 29, which is recessed at 30, to receive an arbor 31, and an eccentric gear, 32, mounted on said arbor. In the bottom of the recess, 30, is a rectangular pocket, 33, in which is mounted a spring, 34, on top of which rests a yoke, 35, in the upwardly extending ends of which is journaled the arbor 31.

Mounted to slide longitudinally within the telescope tube, 10, is a collar, 36, carrying a rack, 37, which extends into the slot, 28, and into engagement with the eccentric gear, 32, pressed upwardly by the spring, 34.

Within the collar, 36, is rotatably mounted a tube, 38, which has an annular projection 39 abutting the rear face of said collar, and the nut, 40, abutting the forward face thereof to secure it in position. Within the forward end of the tube, 38, is mounted another tube, 41, which comprises a mounting for a double or birefringent prism, 42.

Upon the outer face of the portion of the tube, 38, which extends rearwardly from the projection, 39, are the longitudinally disposed projections or tongues, 42$^a$, one of which is shown in dotted lines in Fig. 3. Slipping over the tube, 38, is a tube, 43, the forward end of which has longitudinal slots, 44, (also shown in dotted lines in Fig. 3) to receive the tongues, 42$^a$. Into the rear end of the tube, 43, is set a suitable eye piece system mounting, 45.

Fitting within the rear end of the telescope tube, 10, and secured in position by the set screw, 46, is a piece of tubing, 47, which fits closely about the tube, 43, and in which is a transversely disposed slot, 48, (clearly shown in Figs. 3 and 4) through which extends a handle 49, secured radially to the tube, 43. A collar, 50, through which the handle, 49, also extends fits snugly about the tube, 47, and serves to close the slot, 48, and add finish to the instrument. The slot, 48, is so proportioned that it will permit of the rotation of the tube 47, only through a definite number of degrees.

It will now be seen that while the collar, 36, which carries the tube, 38, and prism, 42, may be racked longitudinally backward and forward by means of the arbor, 31, so as to shift the position of the prism, 42, the tube, 38, may also be rotated in the collar, 36, by means of the engagement of the slots, 44, in the tube, 43, with the tongues 42$^a$, which will rotate the prism without disturbing the telescope, and that the amount of rotation thus obtainable may be definitely limited by the dimension of the slot 48, in the piece of tubing 47.

The mires or targets 51, the reflections of the images of which from the corneal surface form the data for determining the degree of its curvature, are located within the concaved disk, 23, at equal distances from the optical axis of the instrument. It is necessary to have at least two targets or mires located at equal distances from the optical axis of the instrument, and upon the same meridian; and, so far as I am aware, prior to my invention, only two such mires have been employed in ophthalmometers employing a movable prism for effecting the approximation and separation of the images. With facilities as above described for rotating such a prism it is necessary to have other mires located upon other meridians, and this construction is shown in Fig. 2, in which the mires are designated by the reference numeral, 51. I have shown mires situated upon two meridians at right angles to one another, but mires may be located on any number of meridians without departing from the spirit of my invention.

The disposition of the scales and the mechanical arrangements so that uniform scales may be employed and the difference in curvature between successive observations shown in terms of the refractive value of the curvature without calculation, are illustrated in Figs. 3, 6, 7, 8, 9, and 10.

From the above description it will be perceived that a rotation of the arbor, 31, will impart a gradually increasing or decreasing longitudinal motion to the prism, 42, through the instrumentality of the eccentric gear 32. The eccentricity of this gear is so calculated that an equal rotation of the arbor, 31, will cause the prism to travel the necessary distance for a unit refractive difference in curvature. The provision of the means for moving the prism through different distances while the arbor moves only a uniform distance, is not my invention, but by reason thereof I have been able to provide the following simple means for showing the difference in curvature between successive observations in terms of the refractive power without calculation. The possibility of using such uniform scales is of advantage both from a manufacturing and utilitarian standpoint.

The scales are arranged as follows:— Firmly secured to the right hand end of the arbor, 31, is a wheel 52 of suitable diameter the periphery whereof is flat and of sufficient width to receive a scale, 53, so arranged that the position of the prism for observing the different curvatures will be indicated in diopters or the refractive value of that curvature in a known medium. Mounted snugly, but so as to permit of being rotated, upon the left hand end of the arbor, 31, is a wheel, 54, similar in general respects to the wheel, 52, except that upon its periphery the dioptric scale, 55, is numbered from zero successively in both directions, as clearly shown in Fig. 9. This scale may also be conveniently labeled as shown in Fig. 9, upon the forward side of zero with the legend "Against the rule" and to the rear of the zero with the legend "With the rule". Fixed to the barrel of the telescope, in any suitable manner, are pointers, 57, the ends of which extend over the scale and form a reading point.

The mode of operation is as follows:— The horizontal meridian of the eye is brought under observation and the true axis of curvature nearest the horizontal is ascertained. This will give upon the right hand wheel the dioptric value of the curvature upon that axis. The left hand wheel is now rotated upon the arbor, 31, until the zero mark is under the pointer 57. The prism is now rotated which brings its base at right angles to the axis of the other mires without the necessity of other manipulation. If there is astigmatism a new adjustment will be necessary. To make this adjustment the arbor 31, is rotated. This carries both the wheels 52 and 54 and the scales 53 and 55, which they carry on their peripheries, under the pointer arms to a point suitable for the different curvature of the cornea at that point. The right hand scale 53 will now show the refractive power of the curvature at the new position and the left hand scale 55 will show the difference in diopters between the successive observations. Inasmuch as it is usual when there is a difference in curvature between different meridians of the eye that the horizontal meridian is of greater radius or less refractive power than the vertical, this condition has become known and expressed as a rule. I have provided for utilizing this practice by placing at convenient points upon the left hand wheel, 54, as above described, the legends "With the rule" and "Against the rule." It will now be seen that not only the curvature of the different meridians examined will be shown in terms of the refractive power of the curvature by reference to the right hand wheel, but that the difference between successive examinations in diopters, or the amount of astigmatism in terms which are necessary in prescribing its correction, and the manner in which this correction is to be applied will be shown by reference to the left hand wheel without the necessity of any calculation whatever.

Having thus described my invention what I claim as new and desire to secure by Letters Patent, is:—

1. In an ophthalmometer, a telescope, mires fixed at equal distances from the optical axis of the telescope on a plurality of meridians, means located within the optical system for approximating or separating the images of mires upon a single meridian, and means for bringing said last mentioned means into co-active relation with different meridians.

2. An ophthalmometer comprising a telescope, fixed mires on different meridians of said telescope, a double prism movably mounted in said telescope, and means for rotating said prism to bring its base at right angles to the different meridians.

3. In an ophthalmometer, a plurality of mires fixed upon different meridians of a circle, a telescope centrally located with respect to said mires, a collar located within said telescope, means for moving said collar longitudinally of said telescope, a tube rotatably mounted in said collar, tongues carried by said tube, another tube mounted in said telescope, slots in said tube for receiving said tongues, an eye piece carried by said last mentioned tube and a double prism mounted within said rotatably mounted tube.

4. In an ophthalmometer, a stand, a telescope mounted upon said stand, a concave disk carried near the objective end of said telescope, mires located within said disk at equal distances from the center and on different meridians, means for illuminating said mires from the rear, a double prism mounted transverse to the optical axis of said telescope, means for moving said prism longitudinally of said telescope, and means for rotating said prism.

5. In an ophthalmometer, a telescope, mires fixed with relation to the optical axis thereof, a double prism mounted within said telescope and transverse to the axis thereof, an arbor for moving said prism longitudinally of said telescope, a wheel fixed with relation to said arbor, a wheel rotatably mounted upon said arbor, scales disposed upon said wheels, and fixed pointer arms extending into relation with said scales.

6. In an ophthalmometer, a telescope, mires fixed with relation to the optical axis thereof, a double prism mounted within said telescope and transverse to the axis thereof, an arbor for moving said prism longitudinally of said telescope, a wheel fixed with relation to said arbor, a scale disposed upon said wheel for showing the curvature in terms of its refractive power of that point of adjustment, a wheel rotatably mounted upon said arbor, a scale equal in division to said first mentioned scale but numbered oppositely from a zero point, and fixed pointer arms extending into relation with said scales.

7. In an ophthalmometer, a scale for showing the adjustment of the instrument, and another scale with divisions uniform with said first scale and movable therewith and also with relation thereto for showing in terms of said first scale the difference between successive adjustments.

8. In an ophthalmometer, an adjusting arbor, a wheel mounted fixedly thereon, a scale disposed upon said wheel, a wheel rotatably mounted upon said arbor, a scale with divisions uniform with said first scale disposed upon said second wheel, said scale being indexed in both directions from a zero point, and legends upon said scale indicating the meaning of the movement of said scale.

In testimony whereof I affix my signature in the presence of two witnesses.

CHARLES H. PIXLEY.

Witnesses:
JOHN H. HORDIN,
BENJ. T. ROODHOUSE.

Copies of this patent may be obtained for five cents each, by addressing the "Commissioner of Patents, Washington, D. C."